United States Patent
Ball

(10) Patent No.: US 6,336,413 B1
(45) Date of Patent: Jan. 8, 2002

(54) TALEGATE TABLE

(75) Inventor: William C. Ball, Valencia, CA (US)

(73) Assignee: Trailgate Corporation, Santa Clarita, CA (US)

( * ) Notice: Subject to any disclaimer, the term of this patent is extended or adjusted under 35 U.S.C. 154(b) by 0 days.

(21) Appl. No.: 09/474,726

(22) Filed: Dec. 29, 1999

(51) Int. Cl.$^7$ .............................................. A47B 37/00
(52) U.S. Cl. ........................................ 108/44; 224/521
(58) Field of Search ............................... 108/25, 26, 44, 108/49; 224/510, 511, 521, 519; 312/902

(56) References Cited

U.S. PATENT DOCUMENTS

| | | |
|---|---|---|
| 2,468,579 A | 4/1949 | Vuori |
| 3,896,742 A | 7/1975 | Ferraro |
| 4,023,850 A | 5/1977 | Tillery |
| 4,089,276 A | 5/1978 | Enos |
| 4,236,461 A | 12/1980 | Barksdale |
| 4,394,947 A | 7/1983 | Tartaglia |
| 4,412,635 A | 11/1983 | Bateman |
| 4,452,151 A | 6/1984 | Jarrard |
| 4,455,948 A | 6/1984 | Torres |
| 4,458,963 A * | 7/1984 | Keddie ..................... 312/902 |
| 4,494,465 A | 1/1985 | Fick, Jr. |
| 4,501,457 A | 2/1985 | Pond |
| 4,576,395 A | 3/1986 | Longoria |
| 4,695,218 A | 9/1987 | Boyer |
| 4,775,282 A | 10/1988 | Van Vliet |
| 4,829,910 A | 5/1989 | Lirette |
| 4,887,526 A | 12/1989 | Blatt |
| 4,906,015 A | 3/1990 | LaCroix et al. |
| 4,995,322 A | 2/1991 | Frederick |
| 5,011,361 A | 4/1991 | Peterson |
| 5,106,002 A | 4/1992 | Smith et al. |
| 5,136,953 A | 8/1992 | Schmidt |
| 5,193,878 A | 3/1993 | Weaver |
| 5,232,135 A | 8/1993 | Marren |
| 5,267,748 A | 12/1993 | Curran |
| 5,328,225 A | 7/1994 | Melching et al. |
| 5,368,209 A | 11/1994 | Hill |
| 5,397,147 A | 3/1995 | Ducharme et al. |
| 5,427,033 A | 6/1995 | Bly |
| 5,570,826 A | 11/1996 | Garbes et al. |
| 5,575,521 A | 11/1996 | Speis |
| 5,615,813 A | 4/1997 | Ouellette |
| 5,649,734 A | 7/1997 | Speis |
| 5,664,717 A | 9/1997 | Joder |
| 5,676,292 A | 10/1997 | Miller |
| 5,749,506 A | 5/1998 | Davies |
| 5,752,639 A | 5/1998 | Rice |
| 5,820,004 A | 10/1998 | Lane |

* cited by examiner

Primary Examiner—Peter M. Cuomo
Assistant Examiner—Jerry A. Anderson
(74) Attorney, Agent, or Firm—Jones, Walker, Waechter, Poitevent, Carrere & Denegre, L.L.P.

(57) ABSTRACT

A tailgate table having a first arm, a second arm, and a table member is disclosed herein. The first arm is configured for easy attachment to the existing trailer hitch receiver of a vehicle. The table member attaches to the second arm, which attaches to the first arm. The table member is configured with sidewalls and a bottom forming an interior. The interior may be compartmentalized. A top is hingedly attached to the table member to provide a substantially planar upper working surface when the top covers the interior.

20 Claims, 5 Drawing Sheets

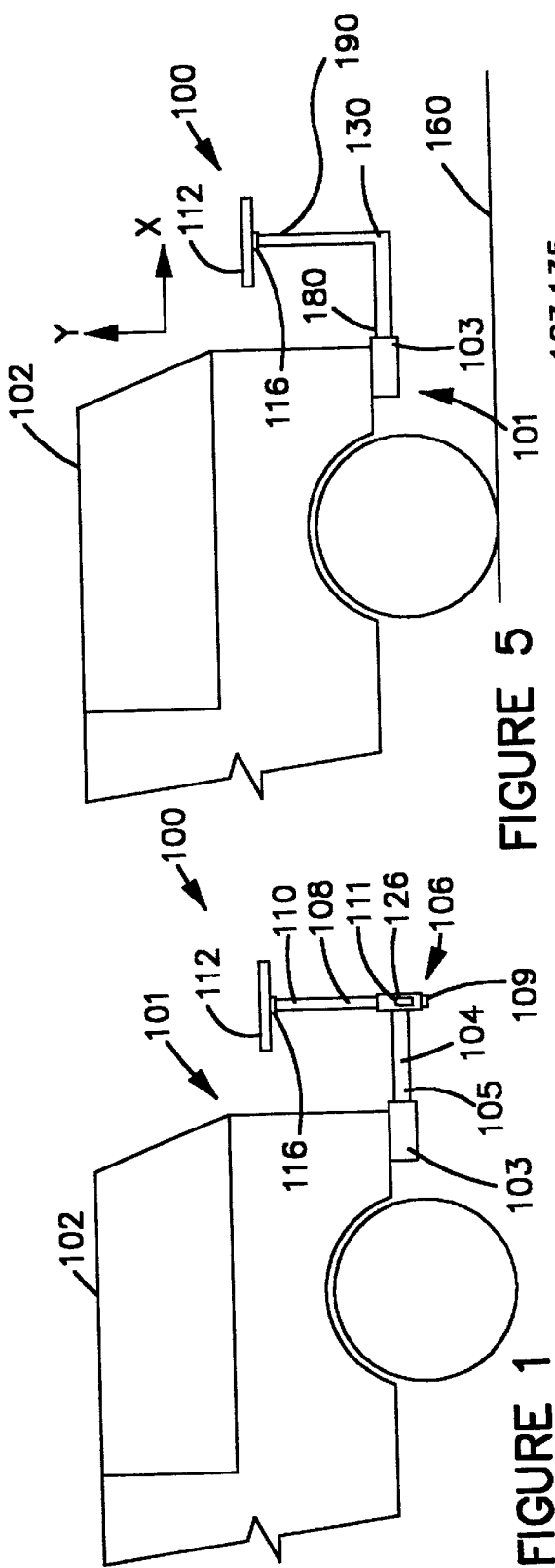

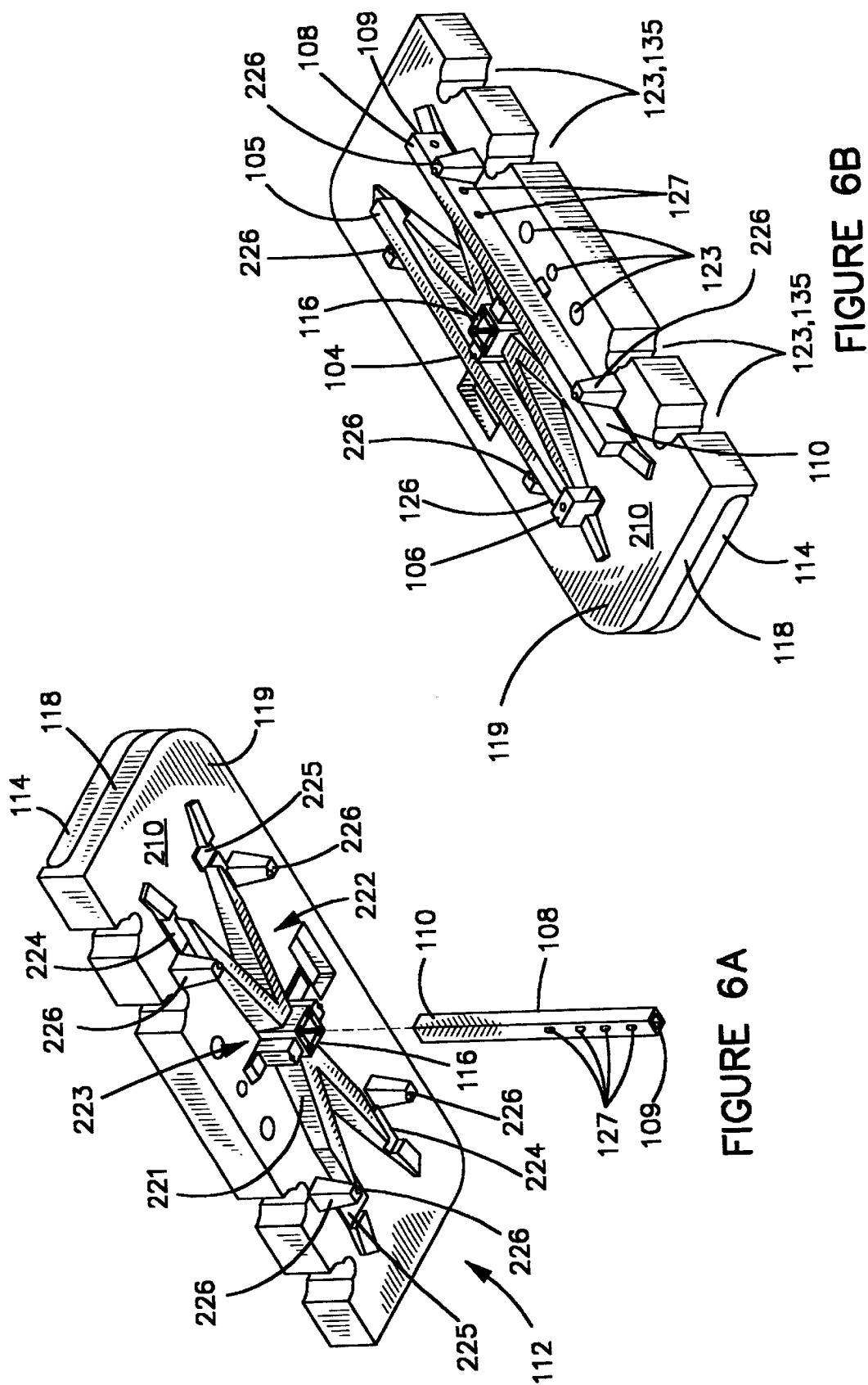

TALEGATE TABLE

BACKGROUND OF THE INVENTION

1. Field of the Invention

This invention relates to portable table apparatuses, namely apparatuses that are removably attached to trailer hitch mounts found on most vehicles.

2. Prior Art

Many attempts have been made in the past to provide utility tables that can attach to the back of a vehicle for use on hunting and camping trips, on remote job sites, and at tailgate parties around the stadiums and arenas where sporting events are held.

Unfortunately, the prior art devices have disadvantages. Some of the devices are heavy, cumbersome, and difficult to install. Other devices are adapted for use only with trucks having beds or with trucks having tailgates. Thus, a need exists for a utility table that is adaptable to all types of vehicles. A need also exists for a utility table that is lightweight and easy to install.

OBJECTS AND ADVANTAGES OF THE INVENTION

The present invention meets these needs by providing a table constructed of lightweight durable plastic that is easy to install in a short period of time with a minimum number of parts.

With the aforementioned considerations in mind, it is therefore an object of this invention to provide a lightweight utility table that is easy to install.

It is a further object of this invention to provide a utility table that can be used with any type of vehicle.

These and other advantages and objects of this invention shall become apparent from the ensuing description of the invention.

SUMMARY OF THE INVENTION

The invention disclosed herein is a tailgate table comprising (a) a first arm having a front end and a tail end whereby the front end is configured for slidable insertion into a receiver hitch of a vehicle and whereby the tail end is configured to attach to a lower end of a second arm; (b) a second arm having an upper and a lower end whereby the lower end is configured to attach to the tail end of the first arm and whereby the upper end is configured to attach to a table member; and (c) a table member configured to engage the upper end of the second arm, comprising (i) one or more sidewalls and a bottom forming an interior; and, (ii) a top attached to the table member having an open and closed position and forming a substantially horizontal surface when said top is in the closed position.

BRIEF DESCRIPTION OF THE DRAWINGS

FIG. 1 illustrates a side view of the tailgate table invention shown installed on the trailer hitch receiver of a vehicle.

FIG. 2 illustrates a top view of the table member.

FIG. 5 illustrates a side view of invention incorporating a single-piece L-shaped support member.

FIG. 6A illustrates a bottom perspective view of the table member with the second arm exploded from the mounting bracket.

FIG. 6B illustrates the table member as shown in FIG. 6 including the arms mounted thereon for storage.

DETAILED DESCRIPTION OF THE PREFERRED EMBODIMENTS OF THE INVENTION

Illustrations of construction, design, and methods of operation of the invention are set forth below with specific references to the Figures. However, inventor does not intend to limit the scope of his invention to these embodiments.

Figure 4:
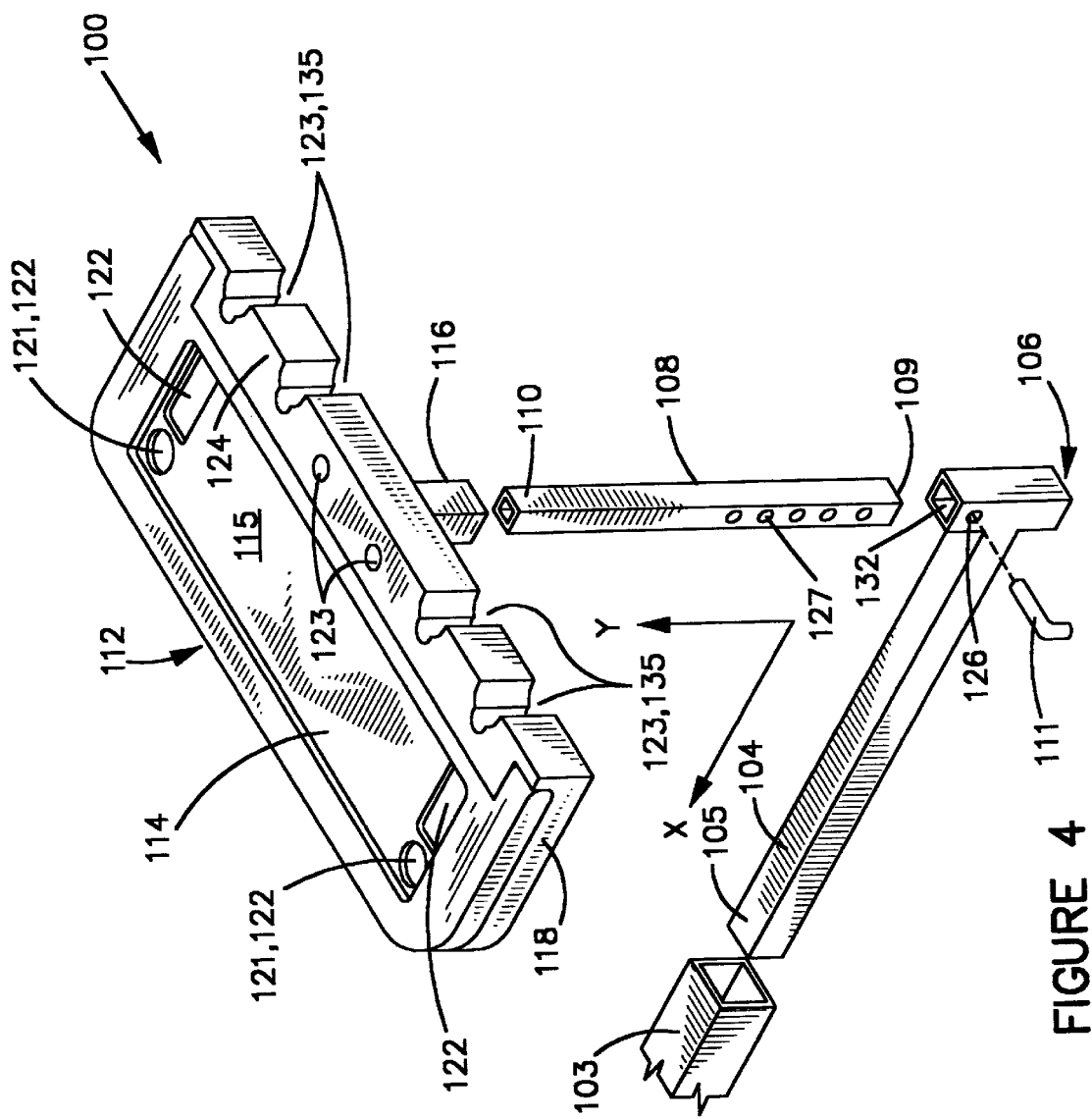
FIG. 4 illustrates a perspective view of the embodiment shown in FIG. 1, exploded to show the attachment of the components of the invention.

As shown in FIGS. 1 and 4, tailgate table 100 generally comprises a first arm 104 that mounts on a vehicle 102 (not shown in FIG. 4) at trailer hitch receiver 103; a second arm 108 configured to engage the tail end 106 of first arm 104; and, a table member 112 configured to engage the upper end 110 of second arm 108. In the embodiments shown in FIGS. 1 and 4, first arm 104 extends substantially horizontally, and second arm 108 extends substantially vertically. As used herein, "vertical" shall mean substantially along the y-axis shown in the Figures, while "horizontal" shall mean substantially along the x-axis shown in the Figures.

Alternatively, first arm 104 and second arm 108 could be combined into a single support member 130 as shown in FIG. 5 having a first end 180 slidably insertable into a trailer hitch receiver 103 and a second end 190 onto which table member 112 mounts. Preferably, support member 130 is configured so that table member 112, when attached to support member 130, is positioned between about 1–5 feet from the rear bumper of vehicle 102, and between about two and about six feet above ground level 160.

Referring back to FIGS. 1 and 4, tailgate table 100 is positioned near the rear 101 of vehicle 102 by slidably inserting the front end 105 of first arm 104 into trailer hitch receiver 103. Preferably, there are no connections, pinned or otherwise, that fix the position of first arm 104 relative to hitch receiver 103 to prevent users of table 100 from mounting table 100 onto hitch receiver 103 when vehicle 102 is moving. First arm 104 is preferably about 3–5 feet long so that table member 112 is conveniently located near the rear 101 of vehicle 102.

Viewing FIG. 4, tail end 106 of first arm 104 is configured with a bore 132 therein to receive lower end 109 of second arm 108. Preferably, bore 132 extends through tail end 106 and is configured with at least one pair of substantially aligned apertures 126 therein. Lower end 109 is configured with at least one, more preferably at least two, substantially aligned apertures 127 so that the height of table member 112, relative to ground level 160, is vertically adjustable. A pin 111 is inserted through aligned apertures 126 in bore 132 and through aligned apertures 127 to fixedly position second arm 108 relative to first arm 104.

Viewing FIGS. 6A and 6B, table member 112 has a bracket 116 configured as a part thereof on lower surface 210 of table member 112. Bracket 116 is configured so that upper end 110 of second arm 108 slides within bracket 116 and releasably mounts therein with minimal rotational movement of table member 112 about the central axis of second arm 108. Lower surface 210 is configured with an X-shaped support 221 to help stabilize table member 112 when table member 112 is positioned atop second arm 108. Each side 222, 223 of support 221 is configured with a horizontal slot 224 and a T-shaped slot 225 to allow either first or second arm 104, 108 to interchangeably mount along either side 222, 223 of support 221. As shown in FIG. 6B, four stabilizing members 226 help position arms 104, 108 when mounted on lower surface 210.

Table member 112 may be oriented on upper end 110 of second arm 108 in several different positions. First, table member 112 may mount onto second arm 108 as shown in FIG. 4 with the open ends of utility apertures 135 facing away from the rear 101 of vehicle 102. Second, though not shown, table member 112 may be rotated about the central axis of second arm 108 approximately 180 degrees so that the open ends of utility apertures 135 face toward the rear 101 of vehicle 102. Though not shown, table member 112 may also be rotated about 90 degrees about the central axis of second arm 108 from that shown in FIG. 4 so that table member 112 can be easily accessed from both elongated sides without interference from horizontally extending first arm 104.

Figure 3:
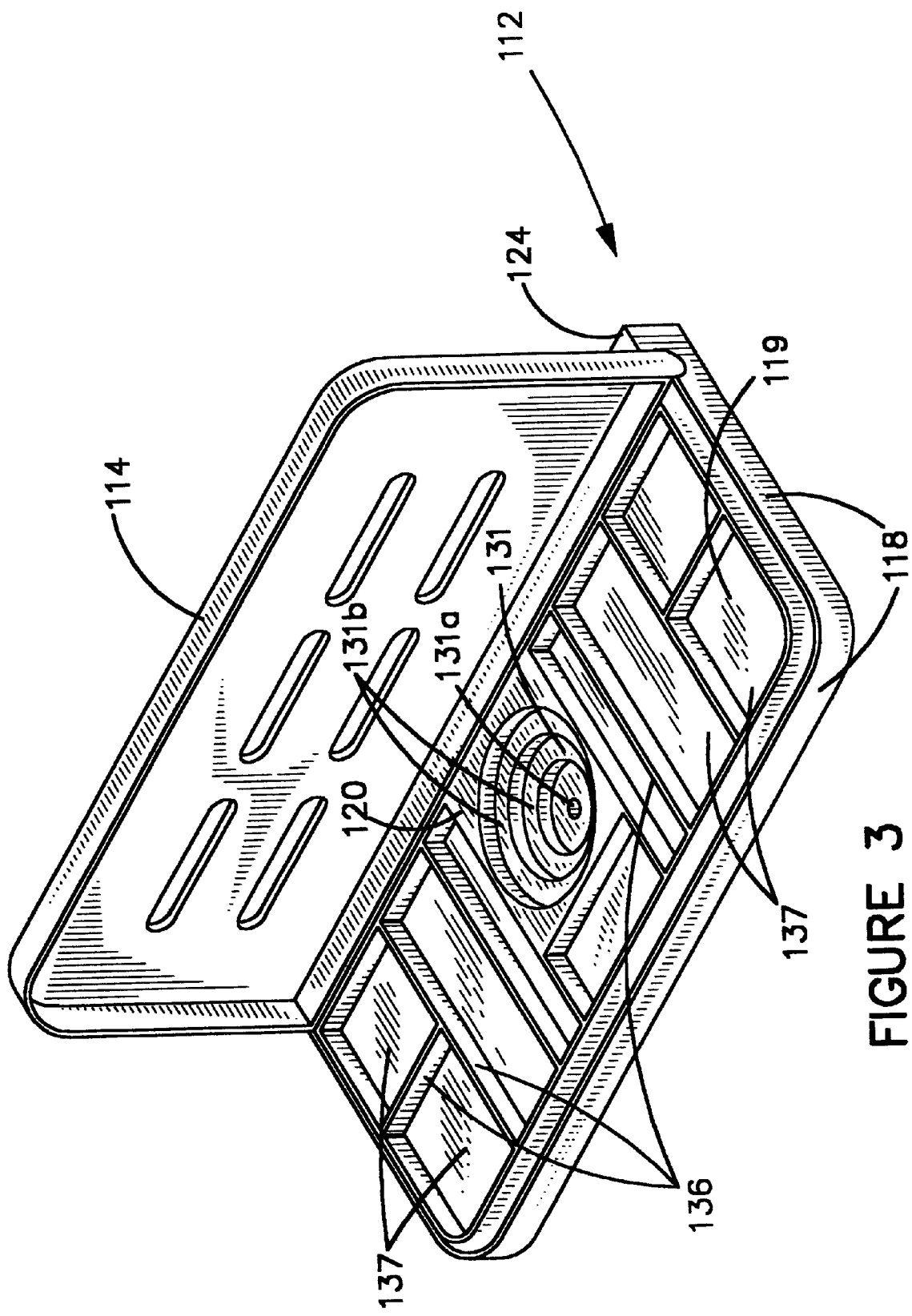
FIG. 3 illustrates a top perspective view of the table member with the top in the open position.

Viewing FIGS. 3 and 4, table member 112 is configured to have at least one sidewall 118, preferably four sidewalls 118 in a rectangular or square embodiment, a top 114, and a bottom 119 enclosing an interior 120. Top 114 is attached to table member 112, preferably using hinges or other suitable means, so that top 114 covers interior 120 in a closed position and forms a substantially planar horizontal surface. As shown in FIG. 2, the upper surface 115 of top 114 is configured to have one or more recessed areas 122 therein, such as at least one cup holder 121. Table member 112 is constructed with a lip 124 along at least one sidewall 118. Lip 124 is configured with a variety of utility apertures 123, such as open-ended U-shaped apertures 135 which are used for holding objects upright. Other apertures 123 may be configured within lip 124 to meet a users specific need, such as for mounting or positioning various items or accessories including gun holders, umbrellas and the like.

Top 114 is shown in an open position in FIG. 3. Interior 120 of table member 112 is configured to have one or more partitions 136 positioned therein to form one or more compartments 137, including a plate compartment 131 comprised of vertically offset concentric circular cut-outs 131b for holding different sized plates. Plate compartment 131 is configured with a tubular aperture 131a configured therein that serves two purposes. First, it allows moisture to drain from within compartment 131 and helps strengthen and stabilize table member 112 to prevent deformation and bending about bracket 116 when table member 112 is positioned atop bracket 116.

Figure 7:
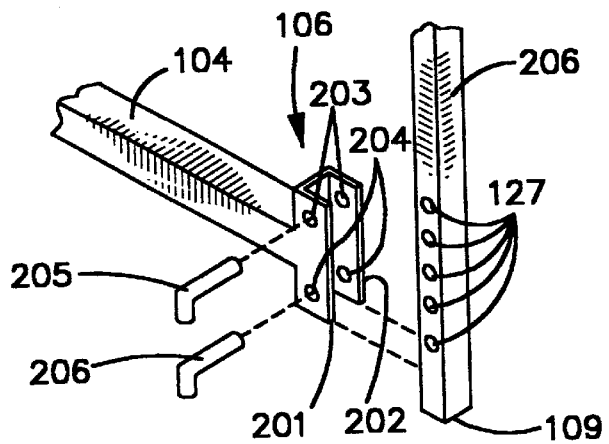
FIG. 7 illustrates an alternate embodiment of the invention which allows the second arm to pivotally connect to the first arm.

FIG. 7 illustrates an alternate embodiment of the engagement between first arm 104 and second arm 108. Tail end 106 of first arm 104 is configured to have a pair of plates 201, 202 extending therefrom. Each plate 201, 202 has two pairs 203, 204 of substantially aligned apertures. Pins 205, 206 are inserted through corresponding pairs 203, 204 of apertures and apertures 127 to mount second arm 108 is a substantially upright position.

Figure 8:
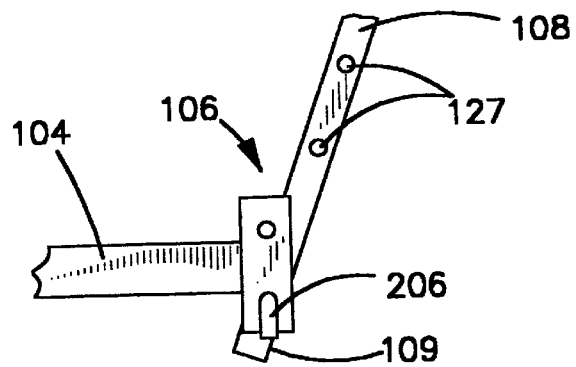
FIG. 8 illustrates a side view of the embodiment shown in FIG. 7 where the upper mounting pin has been removed to allow the second arm to pivot about the lower mounting pin.
Figure 9:
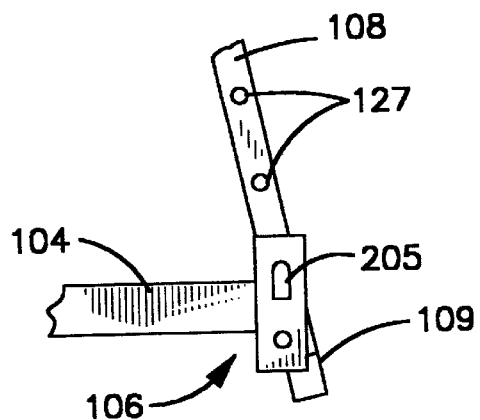
FIG. 9 illustrates a side view of the embodiment shown in FIG. 7 where the lower mounting pin has been removed to allow the second arm to pivot about the upper mounting pin.

Viewing FIG. 8, if a user wishes to tilt second arm 108 (and/or table member 112) away from vehicle 102 to open a vehicle tailgate without removing table member 112, the user removes upper pin 205, allowing second arm 108 to pivot about lower pin 206. Viewing FIG. 9, if a user wishes to tilt second arm 108 (and/or table member 112) toward vehicle 102, the user removes lower pin 206, allowing second arm 108 to pivot about upper pin 205.

First and second arms 104, 108 are preferably constructed from a durable material, such as cold rolled steel. The components of table member 112 are preferably constructed from lightweight plastic, such as linear low density polyethylene (LLDPE) or cross-linked polyethylene (XLPE). Table member 112 may be rotationally molded, blow molded or injection molded.

All components of tailgate table 100 are preferably constructed from durable and lightweight plastic so that table 100 can be easily and quickly installed.

Although the preferred embodiment has been described, it will be appreciated by those skilled in the art to which the present invention pertains that modifications, changes, and improvements may be made without departing from the spirit of the invention defined by the claims.

I claim:

1. A table apparatus for use with a vehicle having a receiver hitch comprising:
   (a) a first arm comprising a front end and a tail end, said front end configured to be slidably insertable into said receiver hitch, said tail end configured to engage a second arm, said first arm configured to extend substantially horizontally from said receiver hitch when said front end is inserted into said hitch;
   (b) a second arm comprising an upper and a lower end, said lower end configured to engage said tail end of said first arm, said upper end configured to engage a table member, said second arm configured to extend substantially vertically from said first arm when said lower end is engaged with said tail end of said first arm;
   (c) a table member configured to engage said upper end of said second arm, said table member comprising a bottom, a top having an open and closed position, and at least one sidewall extending between said top and said bottom when said top is in said closed position, said sidewall, said bottom and said top defining an interior; said bottom including a lower surface having slots adapted to hold said first and second arms, and said top member forming a substantially horizontal surface when said top is in said closed position and said table member is engaged with said upper end of said second arm.

2. A table apparatus according to claim 1 wherein said upper surface of said top is configured to have at least one recessed area.

3. A table apparatus according to claim 2 wherein said top has an upper surface having at least one cup holder.

4. A table apparatus according to claim 2 wherein said table member is configured to have a lip, said lip configured to have one or more utility apertures.

5. A table apparatus according to claim 4 wherein said tail end is configured with a bore therethrough, said bore configured to receive said lower end of said second arm.

6. A table apparatus according to claim 1 wherein said table member is constructed from a lightweight material.

7. A table apparatus according to claim 6 wherein said lightweight material is plastic.

8. A table apparatus according to claim 1 wherein said interior is divided into one or more compartments.

9. A table apparatus according to claim 8 wherein said table member is configured to have a lip, said lip configured to have one or more utility apertures.

10. A table apparatus according to claim 9 wherein said tail end is configured with a bore therethrough, said bore configured to receive said lower end of said second arm.

11. A table apparatus according to claim 1 wherein said second arm is configured to slidably engage said tail end of said first arm in a manner allowing the height of said second arm to be adjusted relative to said first arm.

12. A table apparatus according to claim 1 wherein said table has a width, a length, and a depth, said depth being less than half of the shorter of said length or said width.

13. A table apparatus for use with a vehicle having a receiver hitch comprising:

(a) a first arm configured to engage said receiver hitch and configured to engage a second arm, said second arm extending between said first arm and a table member; and, (b) said table member configured to engage said second arm, and comprising sidewalls, a top having an open and a closed position, and a bottom defining an enclosed interior, said bottom including a lower surface having slots adapted to hold said first and second arms; and said table member forming a substantially horizontal surface when said table member is engaged with said second end, wherein said table has a width, a length, and a depth, said depth being less than approximately one half of the shorter of said length or said width.

14. A table apparatus according to claim 13 wherein said second arm pivotally engages said first arm.

15. A table apparatus according to claim 14 wherein said first arm comprises a tail end having a slot therein, said slot configured to receive said second arm, said slot further configured to have at least two pairs of substantially aligned apertures therein positioned on opposite sides of said slot, said apertures configured to receive a pin.

16. A table apparatus according to claim 15 further comprising at least one pin removably engageable with each of said pairs of apertures.

17. A table apparatus according to claim 13 wherein said interior is divided into one or more compartments.

18. A table apparatus according to claim 17 wherein said interior is divided into two halves and each of said halves includes at least two rectangular compartments.

19. A table apparatus according to claim 17 wherein one of said compartments comprises a vertically offset concentric circular cutout.

20. A table apparatus for use with a vehicle having a receiver hitch comprising:

(a) a first arm configured to engage a receiver hitch and configured to engage a second arm, said second arm extending between said first arm and a table member, said second arm having a mechanism allowing vertical adjustment of said second arm relative to said first arm; and, (b) said table member configured to engage said second arm, and comprising sidewalls, a top having an open and a closed position, and a bottom defining an enclosed interior, said bottom including a lower surface having slots adapted to hold said first and second arms; and said sidewalls being sized such that said table has a width, a length, and a depth, wherein said depth is less than approximately one half of the shorter of said length or said width.

* * * * *